United States Patent
Banerjee et al.

(10) Patent No.: US 12,393,197 B2
(45) Date of Patent: Aug. 19, 2025

(54) SYSTEMS AND METHODS FOR OBJECT DETECTION USING A GEOMETRIC SEMANTIC MAP BASED ROBOT NAVIGATION

(71) Applicant: Tata Consultancy Services Limited, Mumbai (IN)

(72) Inventors: Snehasis Banerjee, Kolkata (IN); Brojeshwar Bhowmick, Kolkata (IN); Ruddra Dev Roychoudhury, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 220 days.

(21) Appl. No.: 18/050,015

(22) Filed: Oct. 26, 2022

(65) Prior Publication Data

US 2023/0236606 A1    Jul. 27, 2023

(30) Foreign Application Priority Data

Jan. 21, 2022    (IN) .............................. 202221003604

(51) Int. Cl.
    *G05D 1/00*    (2024.01)
(52) U.S. Cl.
    CPC ......... *G05D 1/0274* (2013.01); *G05D 1/0214* (2013.01); *G05D 1/0238* (2013.01); *G05D 1/0246* (2013.01)
(58) Field of Classification Search
    CPC .. G05D 1/0238; G05D 1/0214; G05D 1/0274; G05D 1/0246; G05D 1/12; G06V 2201/07; G01S 13/726
    See application file for complete search history.

(56) References Cited

U.S. PATENT DOCUMENTS

| 7,193,557 B1 * | 3/2007 | Kovacich | G01S 13/726 342/107 |
| 7,194,353 B1 * | 3/2007 | Baldwin | G08G 5/0039 701/528 |

(Continued)

OTHER PUBLICATIONS

Y. Aotani, et al. "Development of Autonomous Navigation System Using 3D Map with Geometric and Semantic Information." 2017, Journal of Robotics and Mechatronics, vol. 29 No. 4. <https://www.jstage.jst.go.jp/article/jrobomech/29/4/29_639/_pdf/-char/ja> (Year: 2017).*

(Continued)

*Primary Examiner* — Helal A Algahaim
*Assistant Examiner* — Karen Lynelle Furgason
(74) *Attorney, Agent, or Firm* — Finnegan, Henderson, Farabow, Garrett & Dunner, LLP

(57) ABSTRACT

This disclosure relates generally to systems and methods for object detection using a geometric semantic map based robot navigation using an architecture to empower a robot to navigate an indoor environment with logical decision making at each intermediate stage. The decision making is further enhanced by knowledge on actuation capability of the robots and that of scenes, objects and their relations maintained in an ontological form. The robot navigates based on a Geometric Semantic map which is a relational combination of geometric and semantic map. In comparison to traditional approaches, the robot's primary task here is not to map the environment, but to reach a target object. Thus, a goal given to the robot is to find an object in an unknown environment with no navigational map and only egocentric RGB camera perception.

7 Claims, 8 Drawing Sheets

(56) References Cited

U.S. PATENT DOCUMENTS

| | | | |
|---|---|---|---|
| 2005/0149227 A1* | 7/2005 | Peters, II | G05D 1/0088 |
| | | | 700/245 |
| 2009/0190798 A1* | 7/2009 | Lee | G06V 10/809 |
| | | | 382/103 |
| 2013/0132784 A1* | 5/2013 | Patino-Studencka | G01S 19/20 |
| | | | 714/704 |
| 2015/0253142 A1* | 9/2015 | Kornhauser | G01C 21/3415 |
| | | | 701/408 |
| 2016/0188977 A1* | 6/2016 | Kearns | B25J 11/002 |
| | | | 348/113 |
| 2018/0246520 A1* | 8/2018 | Martinson | G05D 1/0094 |
| 2019/0202449 A1* | 7/2019 | Taveira | G08G 5/045 |
| 2019/0213285 A1* | 7/2019 | Baggeroer | G06Q 10/063 |
| 2020/0003570 A1* | 1/2020 | Marti | G06V 40/103 |
| 2022/0171386 A1* | 6/2022 | Cui | G06Q 10/101 |

OTHER PUBLICATIONS

P. Dames, "Distributed Multi-Target Search and Tracking Using the PHD Filter." 2019, Autonomous Robots, vol. 44. <https://link.springer.com/article/10.1007/s10514-019-09840-9> (Year: 2019).*

Md. Rokunuzzaman, et al. "A Region of Interest (ROI) Sharing Protocol for Multirobot Cooperation With Distributed Sensing Based on Semantic Stability" 2014, IEEE Transactions on Systems, Man, and Cybernetics: Systems, vol. 44, Issue No. 4. <https://ieeexplore.ieee.org/abstract/document/6587589> (Year: 2014).*

Earnest, C. "Dynamic Action Spaces for Autonomous Search Operations," 2005, Massachusetts Institute of Technology, <https://dspace.mit.edu/handle/1721.1/46549/> (Year: 2005).*

Dang, T. et al, "Graph-based Autonomous Robotic Exploration in Subterranean Environments," 2019, IEEE International Conference on Intelligent Robots and Systems, <https://ieeexplore.ieee.org/abstract/document/8968151/> (Year: 2019).*

Braga, Rafael Gomes et al., "Semantic navigation with domain knowledge", Robotic, Date: Jun. 2021, Publisher: Arxiv, https://arxiv.org/pdf/2106.10220.pdf.

Karimi, Sina et al., "An Ontology-Based Approach to Data Exchanges for Robot Navigation on Construction Sites", Robotics, Date: 2021, Publisher: Arxiv., https://arxiv.org/ftp/arxiv/papers/2104/2104.10239.pdf.

Manzoor, Sumaira et al., "Ontology-Based Knowledge Representation in Robotic Systems: A Survey Oriented toward Applications", Applied Science, Date: May 2021, vol. 11 (10), Publisher: MDPI, https://www.mdpi.com/2076-3417/11/10/4324.

Aotani, Yoshihiro et al., "Development of Autonomous Navigation System Using 3D Map with Geometric and Semantic Information", Journal of Robotics and Mechatronics, Date: Aug. 2017, vol. 29 (4), Publisher: Research Gate, https://search.proquest.com/openview/a36ec1e66bebb9ada3435eebb9fabe70/1.pdf?pg-origsite=gscholar&cbl=4911629.

* cited by examiner

SYSTEMS AND METHODS FOR OBJECT DETECTION USING A GEOMETRIC SEMANTIC MAP BASED ROBOT NAVIGATION

PRIORITY CLAIM

This U.S. patent application claims priority under 35 U.S.C. § 119 to: India Application No. 202221003604, filed on Jan. 21, 2022. The entire contents of the aforementioned application are incorporated herein by reference.

TECHNICAL FIELD

The disclosure herein generally relates to the field of robot navigation, and, more particularly, to systems and methods for object detection using a geometric semantic map based robot navigation.

BACKGROUND

The field of Robotics has witnessed rapid growth in recent times. The emergence of sophisticated algorithms has enabled robots to operate in human occupied environments such as homes, hotels, public spaces, corporate offices, and/or the like. This has led to the emergence of service robots and allied services. One of the principal tasks that a service robot needs to perform very well is navigation. Conventionally geometric reconstruction and path-planning based approaches and complete learning-based approaches are used for robot navigation. To navigate in an environment, the robot needs to sense a scene in some way. Visual perception capability of a robot enables it to fine-tune its understanding about an observed scene. Thus, compared to traditional techniques of robot navigation, semantic navigation enables the robot to achieve complex navigation goals based on richer understanding of the scene and context. While a few conventional approaches utilize semantic visual navigation, they may require depth perception and sufficient amount of policy training, making it difficult to deploy in complex real-world scenarios.

SUMMARY

Embodiments of the present disclosure present technological improvements as solutions to one or more of the above-mentioned technical problems recognized by the inventors in conventional systems. For example, in one embodiment, a processor implemented method is provided. The processor implemented method, comprising acquiring, via an image capturing device mounted on a robotic device executed by one or more hardware processors, a set of successive egocentric images corresponding to one or more views of one or more scenes in an action space based-indoor environment, wherein the action space based-indoor environment comprises a target object to be detected; retrieving from a knowledge store comprised in a system database, via the one or more hardware processors, a semantic relational knowledge representation, maintained in an ontological form, for each of the egocentric images from the set of successive egocentric images corresponding to the one or more views of the one or more scenes in the action space based-indoor environment, wherein the knowledge store comprises a plurality of informative data associated with (i) actuation capability of the robotic device during navigation, and (ii) the one or more scenes in the action space based-indoor environment; generating, via the one or more hardware processors, a geometric semantic map for the action space based-indoor environment based on the semantic relational knowledge representation and a geometrical movement monitoring of the robotic device; iteratively performing, via the robotic device executed by the one or more hardware processors, a navigation step based on the geometric semantic map until at least one of (i) the target object is detected, and (ii) geometric semantic map based analysis of the scene is completed, wherein at each of the navigation step, a plurality of attributes comprising a relative direction of the one or more views, one or more objects in the scene with a confidence score, and a landmark score computed for the navigation step are stored; and dynamically updating the geometric semantic map and the knowledge store with information of analyzed scenes learned over a period of time at each navigational step.

In another embodiment, a system is provided. The system comprising a memory storing instructions; one or more communication interfaces; a filter device; and one or more hardware processors coupled to the memory via the one or more communication interfaces, wherein the one or more hardware processors are configured by the instructions to: acquire, via an image capturing device mounted on a robotic device executed by one or more hardware processors, a set of successive egocentric images corresponding to one or more views of one or more scenes in an action space based-indoor environment, wherein the action space based-indoor environment comprises a target object to be detected; retrieve from a knowledge store comprised in a system database, via the one or more hardware processors, a semantic relational knowledge representation, maintained in an ontological form, for each of the egocentric images from the set of successive egocentric images corresponding to the one or more views of the one or more scenes in the action space based-indoor environment, wherein the knowledge store comprises a plurality of informative data associated with (i) actuation capability of the robotic device during navigation and (ii) the one or more scenes in the action space based-indoor environment; generate, via the one or more hardware processors, a geometric semantic map for the action space based-indoor environment based on the semantic relational knowledge representation and a geometrical movement monitoring of the robotic device; iteratively perform, via the robotic device executed by the one or more hardware processors, a navigation step based on the geometric semantic map until at least one of (i) the target object is detected, and (ii) geometric semantic map based analysis of the scene is completed, wherein at each of the navigation step, a plurality of attributes comprising a relative direction of the one or more views, one or more objects in the scene with a confidence score, and a landmark score computed for the navigation step are stored; and dynamically update the geometric semantic map and the knowledge store with information of analyzed scenes learned over a period of time at each navigational step.

In yet another embodiment, a non-transitory computer readable medium is provided. The non-transitory computer readable medium are configured by instructions for acquiring, via an image capturing device mounted on a robotic device executed by one or more hardware processors, a set of successive egocentric images corresponding to one or more views of one or more scenes in an action space based-indoor environment, wherein the action space based-indoor environment comprises a target object to be detected; retrieving from a knowledge store comprised in a system database, via the one or more hardware processors, a semantic relational knowledge representation, maintained in an ontological form, for each of the egocentric images from the set of successive egocentric images corresponding to the one or more views of the one or more scenes in the action space based-indoor environment, wherein the knowledge store comprises a plurality of informative data associated with (i) actuation capability of the robotic device during navigation, and (ii) the one or more scenes in the action space based-indoor environment; generating, via the one or more hardware processors, a geometric semantic map for the action space based-indoor environment based on the semantic relational knowledge representation and a geometrical movement monitoring of the robotic device; iteratively performing, via the robotic device executed by the one or more hardware processors, a navigation step based on the geometric semantic map until at least one of (i) the target object is detected, and (ii) geometric semantic map based analysis of the scene is completed, wherein at each of the navigation step, a plurality of attributes comprising a relative direction of the one or more views, one or more objects in the scene with a confidence score, and a landmark score computed for the navigation step are stored; and dynamically updating the geometric semantic map and the knowledge store with information of analyzed scenes learned over a period of time at each navigational step.

In accordance with an embodiment of the present disclosure, the geometrical movement monitoring of the robotic device includes recording (i) a successful movement of the robotic device on navigation path, (ii) backtracking the robotic device to a location with next high probability of the target object finding on the navigation path when current trajectory of the robotic device reaches a dead end, and (iii) shortening backtrack exploration if the robotic device is detected to be close to a location in a previous trajectory on the navigation path.

In accordance with an embodiment of the present disclosure, the informative data associated with the one or more scenes in the action space based-indoor environment comprises a plurality of objects, relationship between the plurality of objects, one or more obstacle objects, one or more restricted areas, and one or more landmark points present in the one or more scenes.

In accordance with an embodiment of the present disclosure, the Landmark score is computed based on a) probability of the target object being found in a scene, and b) a combined probability of objects located in the scene and their relations to the target object.

In accordance with an embodiment of the present disclosure, the Landmark score is classified as one of a low landmark score and a high landmark score, wherein the low landmark score indicates movement of the robotic device on an incorrect trajectory, and the high landmark score indicates movement of the robotic device on a correct trajectory.

In accordance with an embodiment of the present disclosure, a step of detecting the target object from one or more objects comprised in a scene and having a maximum probable relation to the target object is performed by determining a parameter computed as a product of (i) the confidence score of the target object, and (ii) a centroid value computed for the target object and the one or more objects with maximum probable relation to the target object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
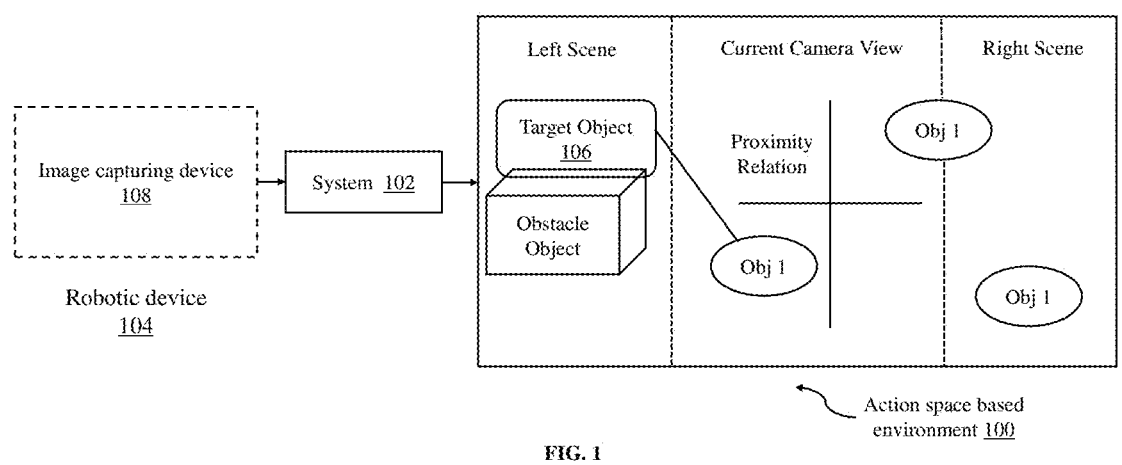
FIG. 1 illustrates an exemplary robotic navigation environment comprising a system for object detection using a geometric semantic map based robot navigation for detection of a target object, in accordance with an embodiment of present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The field of Robotics has witnessed rapid growth in recent times. The emergence of sophisticated algorithms has enabled robots to operate in human occupied environments such as home, hotels, public spaces, corporate offices, and/or the like. This has led to the emergence of service robots and allied services. One of the principal tasks that a service robot needs to perform very well is Navigation. Conventionally geometric reconstruction and path-planning based approaches and complete learning-based approaches are used for robot navigation. However, to navigate an environment, the robot needs to sense a scene in some way. Visual perception capability of a robot enables it to make fine-tuned understanding about observed scenes.

Higher levels of effort to make computing systems simulate human cognitive capabilities have emerged in recent times. Humans are generally very good at the task of navigation. If a person is asked to find an object in an unknown scene, his or her decision making is based on visual cues in current scene. A natural decision a person makes is where to navigate next to get a higher chance of getting more relevant visual cues related to a target object. The person's decision making is based on the person's common sense and semantic knowledge learned by witnessing large number of scenes, to derive an understanding of relations of objects in the scene. Thus, compared to traditional techniques of robot navigation, semantic navigation enables the robot to achieve complex navigation goals based on richer understanding of the scene and context. While a few conventional approaches utilize semantic visual navigation, they may require depth perception and sufficient amount of policy training, making it difficult to deploy in complex real-world scenarios.

A conventional semantic visual navigation based approach utilizes a Bayesian Relational Memory to improve generalization ability for semantic visual navigation agents in unseen environments. However, this approach poses several limitations such as (a) requirement to capture layout apriori from training environments, (b) relations are maintained based on scenes as a whole and not on object scene relations, hence utility is restricted to zone navigation in contrast to target object finding.

There exist several conventional approaches on Semantic Visual Navigation that use scene prior to navigation to known as well as unknown objects in limited settings. These approaches utilize Graph Convolutional Networks (GCNs) to embed a prior knowledge into a Deep Reinforcement Learning framework and are based on Actor-Critic model. The prior knowledge embed into the Deep Reinforcement Learning framework is obtained from largescale datasets designed for scene understanding. However, these conventional approaches fail to formulate actual motion planning and do not provide a concrete decision model when two or more objects are in same frame and testing on real life scenario is also not provided. Further, Deep Reinforcement Learning based frameworks require significant amount of training to learn action policies.

Embodiments of the present disclosure provide systems and methods for object detection using a geometric semantic map based robot navigation using an architecture to empower a robot to navigate an indoor environment with logical decision making at each intermediate stage. The method of the present disclosure mimics to an extent how a human should have behaved in a given scenario. The decision making is further enhanced by knowledge on actuation capability of the robots and that of scenes, objects and their relations maintained in an ontological form. The robot navigates based on a Geometric Semantic map which is a relational combination of a geometric and semantic map. The goal given to the robot is to find an object in an unknown environment with no navigational map and only egocentric RGB camera perception. In other words, the task is to navigate in an indoor environment from a starting point to a specified object location and the task can be said to be complete if the object is visible to a practical extent. The task needs to be completed based on RGB perception of egocentric view of onboard robot camera. The robot needs to carry out the task in unseen environment without pre-specified navigation map. The robot takes navigation decision based on current zone's probability of having an object, visible objects that are closely related to target object, visible occlusions that may hide the object as well as other factors like free space, obstacles and risky or restricted areas. In the method of the present disclosure, the knowledge of environment, the way towards the target, the target zone, or the exact appearance of the target object is unknown. The semantic relational knowledge of the world helps the robot to achieve its goal. Usage of a hybrid map namely 'GeoSem' based on a combination of geometrical and semantical mapping seems to be useful for fast decision making by the robot agent. The method of the present disclosure is tested both on a complex simulation environment as well as in real life indoor settings. More Specifically, the present disclosure describes the following:

1. Semantic navigation algorithm using 'GeoSem' map.
2. A system architecture to enable semantic navigation.
3. Development of an ontology to enable navigation.
4. Successful evaluation in both simulated and real-world indoor environments.

Referring now to the drawings, and more particularly to FIGS. 1 through 7B, where similar reference characters denote corresponding features consistently throughout the figures, there are shown preferred embodiments and these embodiments are described in the context of the following exemplary system and/or method.

FIG. 1 illustrates an exemplary action space based environment 100 comprising a system 102 for object detection using a geometric semantic map based robot navigation by navigating a robotic device 104 in the action space based environment for detection of a target object 106, in accordance with an embodiment of present disclosure. The action space based environment 100 utilizes the robotic device 104 placed at an initial distance to the target object 106 which has to be detected. The robotic device 104 here could be a wheeled robot or any other robot. The robotic device 104 is provided with an image capturing device 108, which is mounted on the top of the robotic device 104. The image capturing device 108 include one or more Red, Green Blue (RGB) cameras. In an embodiment, one or more RGB cameras are used to make the robotic device 104 more affordable and mainstream. In an example embodiment, the robotic device 104 and the one or more RGB cameras mounted on it are used to acquire a set of successive egocentric images corresponding to one or more views of one or more scenes in the action space based-indoor environment and detect the target object 106 placed in the action space based-indoor environment. In an embodiment, the system 102 can be a computer, cloud or edge device. In an embodiment, system 102 can either be implemented as a standalone unit or reside on the robotic device 104.

Figure 2:
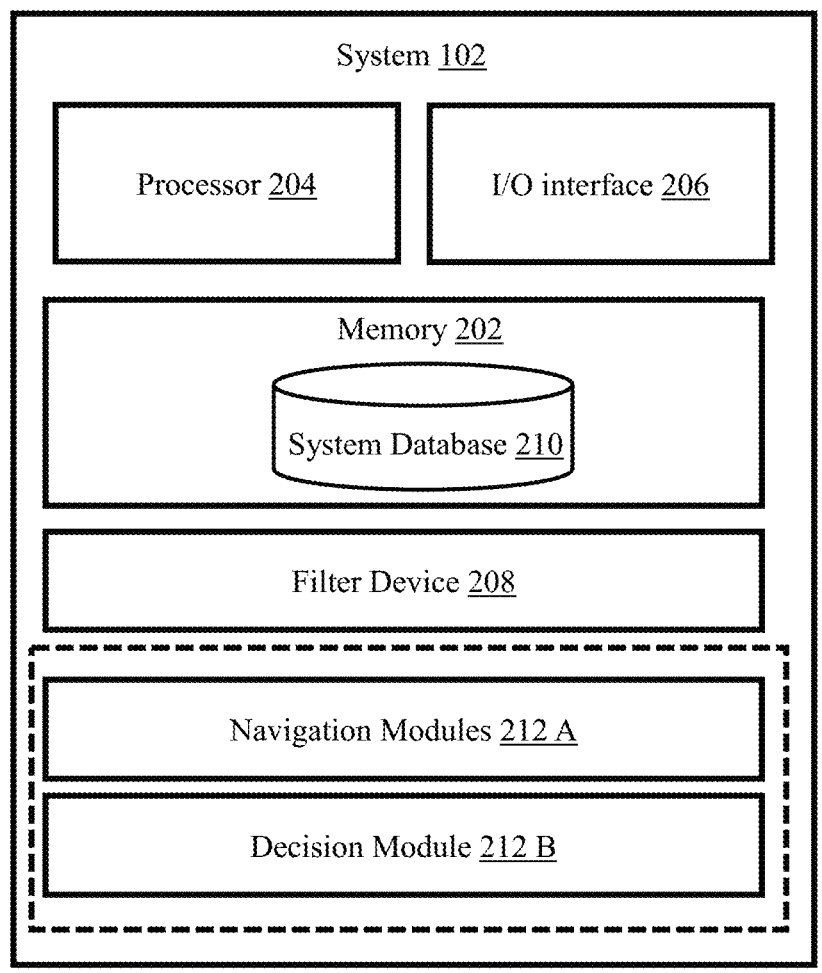
FIG. 2 is a functional block diagram of the system of FIG. 1 for object detection using a geometric semantic map based robot navigation according to some embodiments of the present disclosure.
Figure 3:
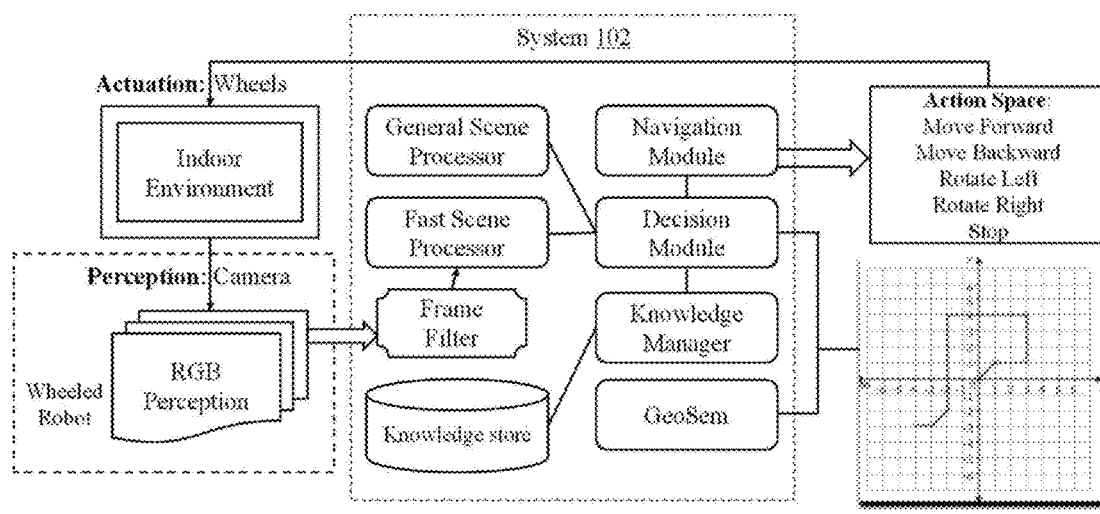
FIG. 3 illustrates a detailed architecture based working of the system of FIG. 1 for object detection using a geometric semantic map based robot navigation according to some embodiments of the present disclosure.

The system 102 is configured to process and analyze the acquired data in accordance with one or more modules 212 such as a navigation module 212A and a decision module 212B, further explained in conjunction with FIG. 2 and FIG. 3. Thus, the system 102 is configured to a set of successive egocentric images corresponding to one or more views of one or more scenes utilizing the image capturing device 108 mounted on the robotic device 104 the action space based-indoor environment 100 and detect the target object 106 by navigating the robotic device 104 using a geometric semantic map.

FIG. 2, with reference to FIG. 1, is a functional block diagram of the system 102 of FIG. 1 for object detection using a geometric semantic map based robot navigation according to some embodiments of the present disclosure. In an embodiment, the system 102 includes one or more hardware processors 204, communication interface device(s) or input/output (I/O) interface(s) 206 (also referred as interface(s)), a filter device 208, and one or more data storage devices or memory 202 operatively coupled to the one or more hardware processors 204. The one or more processors 204 may be one or more software processing components and/or hardware processors. In an embodiment, the hardware processors can be implemented as one or more fast scene processors, one or more general scene processor, one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W 5 and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a system database 210 is comprised in the memory 202, wherein the system database 210 further comprises a knowledge store 210 that stores data in ontological and factual form, a knowledge manager accessing the data stored in the knowledge store, geometric semantic map, the set of successive egocentric images corresponding to the one or more views of one or more scenes in the action space based-indoor environment. The knowledge store further comprises a plurality of informative data associated with (i) actuation capability of the robotic device during navigation and (ii) the one or more scenes in the action space based-indoor environment. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

FIG. 3, with reference to FIGS. 1-2, illustrates detailed architecture-based working of the system 102 of FIG. 1 for object detection using a geometric semantic map based robot navigation according to some embodiments of the present disclosure. As shown in FIG. 3, a wheeled robot is used for navigation and an Action Space is used. The Action Space is limited to movements of the wheeled robot in forward direction or backward directions; and rotations towards left or right with respect to an egocentric view of a scene in the action space based environment; and stop. As can be seen in FIG. 3, the system 102 acquires perception from a RGB camera mounted in first person view of a robotic device and gives out an action command for the wheeled robot to move. In an embodiment, RGB view is only feedback post actuation that the robotic device can get. However, as the action space is of discreet nature, the robotic device is capable of drawing a map of its movements internally. Further, any action is followed by stop for the robotic device to process next view reached upon moving. The robotic device waits (in stop state) until current scene is processed. In case of no dynamic obstacles, the robotic device perception should ideally be turned off during each discreet state of movement. However, in the current scenario, scene processing happens continuously at 30 fps. The one or more modules 212 of the system 102 are incapable of handling such a fast rate of image processing and consequent decision making due to algorithm complexity related time restrictions. Hence, a filter device 208 is used to handle inflow of images and drop frames in order to match processing speed. Conventionally a mask-recurrent convolutional neural network (Mask-RCNN) based object detection and segmentation performs very well. However, in robotic scenario (soft real time system), low performance speed (for example, in the range of 2 fps) is unacceptable. Thus, a fast scene processor namely You Only Look Once (YOLO) v.3 is selected for after being compared for performance with various scene processors in indoor settings. However, YOLO has problems in detecting two or more objects lying in same grid box. Hence, if YOLO is unable to detect objects in current scene, the General Scene Processor which could be a Mask-RCNN based processor is invoked to enable the scene processing. From experiments, it was found that YOLO v.3 was successful in detecting objects most of the time in indoor environment. Further, the Knowledge Manager performs a task of (i) accessing the Knowledge store that stores the data in ontological and factual form and (ii) answering queries using the decision module 212 B. In an embodiment, the knowledge store is updated with scene relations learned over time which is added as a weighted score relative to number of scenes explored to arrive at a relation probability score in first place. Based on internal inferences drawn on processed scene, the decision module 212B updates the geometric semantic map and issues next movement command to the navigation module 212A to comply. The navigation module 212A is tasked with maintaining a synchronized communication with the robotic device's actuation (motor movements) and notifying the decision module 212B once a movement is complete.

Figure 4:
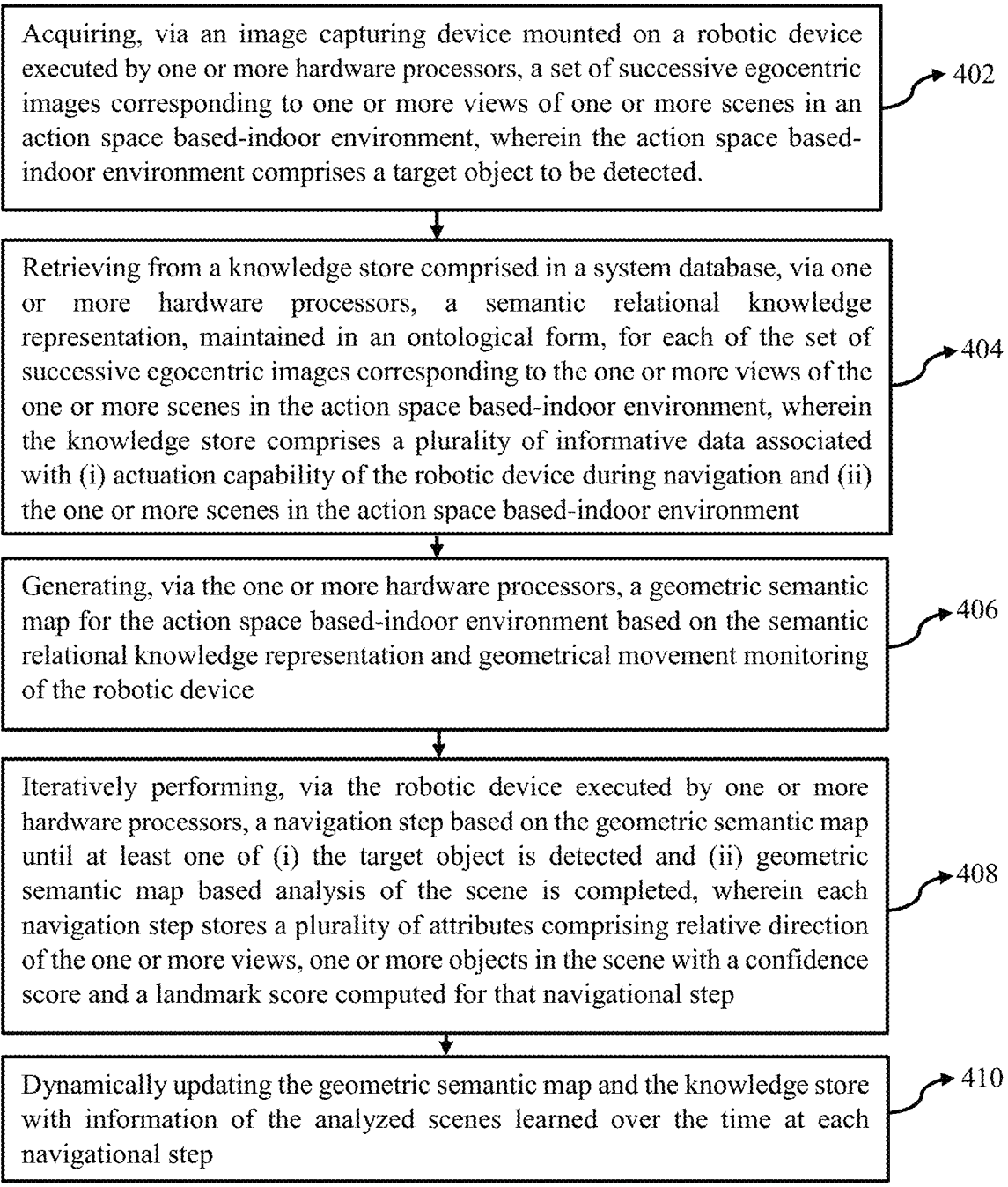
FIG. 4 illustrates an exemplary flow diagram illustrating a method for object detection using a geometric semantic map based robot navigation in accordance with some embodiments of the present disclosure.

FIG. 4, with reference to FIGS. 1-3, depicts an exemplary flow chart illustrating a method 200 for object detection using a geometric semantic map based robot navigation, using the system 102 of FIG. 1, in accordance with an embodiment of the present disclosure.

Referring to FIG. 4, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components the action space based environment 100 of FIG. 1, components of the system 102 of FIG. 2, the block diagram of FIG. 3, the flow diagram as depicted in FIG. 4 and one or more examples. In an embodiment, at step 402 of the present disclosure, the one or more hardware processors 204 are configured to acquire, via an image capturing device 108 mounted on a robotic device 104 executed by the one or more hardware processors, a set of successive egocentric images corresponding to one or more views of one or more scenes in an action space based-indoor environment, wherein the action space based-indoor environment comprises a target object to be detected. In context of the present disclosure, the expressions 'robotic device' and 'robot' can be used interchangeably. In an embodiment, the image capturing device 108 is an RGB camera. In an embodiment, the RGB camera is used to due to its low cost, high availability, and capability to derive superior scene understanding from its perception. As depicted in FIG. 3, the system 102 takes in perception from the RGB camera mounted in first person view of the robot.

In an embodiment, at step 404 of the present disclosure, the one or more hardware processors 204 are configured to retrieve from a knowledge store comprised in the system database, a semantic relational knowledge representation, for each of the egocentric images from the set of successive egocentric images corresponding to the one or more views of the one or more scenes in the action space based-indoor environment. In an embodiment, the semantic relational knowledge representation is maintained in an ontological form. In an embodiment, the knowledge store comprises a plurality of informative data associated with (i) actuation capability of the robotic device during navigation, and (ii) the one or more scenes in the action space based-indoor environment. The informative data associated with the one or more scene in the action space based-indoor environment comprises a plurality of objects, relationship between the plurality of objects, one or more obstacle objects, one or more restricted areas and one or more landmark points present in the one or more scenes. In an embodiment, the one or more obstacle objects are those objects that provide a hinderance in a path to reach the target object. In an embodiment, the one or more restricted areas refer to the areas that are restricted to be explored during navigation. In other words, a scene may comprise different categories of objects such as (a) the target object, (b) relational objects, (c) obstacles and (d) generic scene object extensions such as door. In an embodiment, the one or more obstacle objects may include static obstacles and dynamic obstacles. Further, there can be overlap in the categorization. For example, floor denotes free space, walls are considered as static obstacles, walls on both sides with floor in between in a single egocentric view is considered as a 'passage'.

In an embodiment, at step 206 of the present disclosure, the one or more hardware processors 204 are configured to generate, via the one or more hardware processors, a geometric semantic map for the action space based-indoor environment based on the semantic relational knowledge representation and geometrical movement monitoring of the robotic device. In an embodiment, the geometrical movement monitoring of the robotic device includes recording (i) a successful movement of the robotic device on navigation path, (ii) backtracking the robotic device to a location with next high probability of the target object finding on the navigation path when current trajectory of the robotic device reaches a dead end and (ii) shortening backtrack exploration if the robotic device is detected to be close to a location in a previous trajectory on the navigation path.

The steps 404 through 406 are better understood by way of the following description provided as exemplary explanation.

Figure 5:
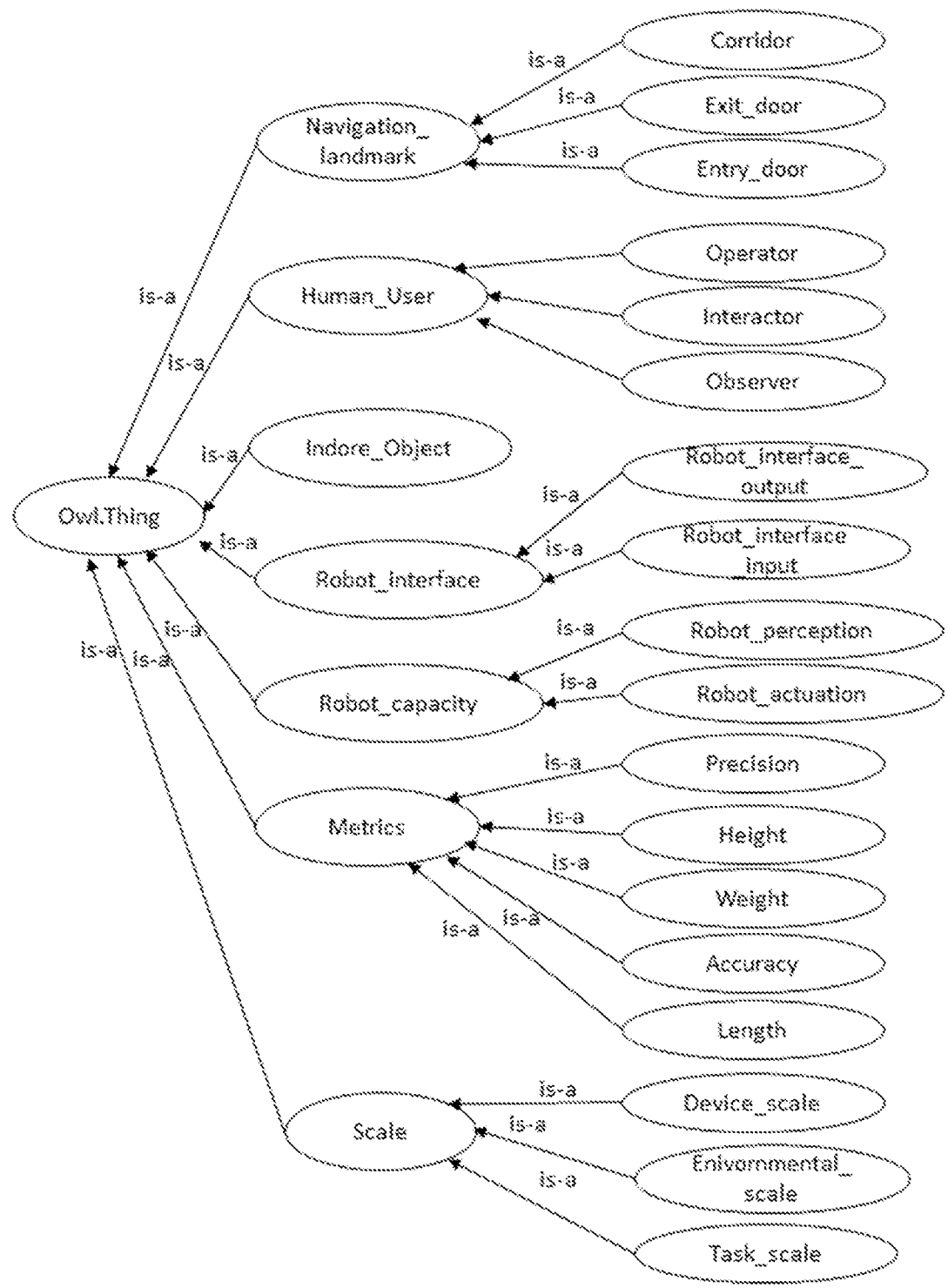
FIG. 5 illustrates an example providing a visual representation of hybrid navigational ontology used for object detection using a geometric semantic map based robot navigation according to some embodiments of the present disclosure.

1. Knowledge Representation: In an embodiment, for representation of semantic knowledge, a semantic web technology-based knowledge representation is used due its scope of extension to the external sources as well as easy availability of standards and software. FIG. 5 shows an example providing a visual representation of hybrid navigational ontology used for object detection using a geometric semantic map based robot navigation according to some embodiments of the present disclosure. Further, categorical and set theoretic relations in robotics are best represented in Web Ontology Language (OWL1) and model instances in Resource Description Framework (RDF2) files. Logical queries based on SPARQL Protocol and RDF Query Language (SPARQL3) enable reasoning on instance relations. Relations are learned by processing scenes from a Visual Genome dataset. Some of the relations are enlisted here:

i. locatedAt(object, zone): this denotes the probability of an object (say television) to be located in a zone (say video conference room). Zones related to risk or restrictions can also be modeled in this way.

ii. coLocatedWith(object, object): this symmetric relation denotes the probability of an object (say 'bottle') to be co-located with another object (say 'cup'). However, to bring in a partial sense of transitive relation, when the target object is provided, a semantic relation graph specific to the target object is generated at initialization time. The longer the edge length between objects in this generated graph, the less is the chance of co-location relation. Distinct co-location probability denotes that the symmetric relation inverse is not repeated. Assuming $\beta$ as a parameter dependent on graph density, relation probability is determined as shown inequation (1) below:

$$RP = \frac{\sum_{i=1}^{n} \beta \cdot \frac{1}{n} \cdot \text{distinct\_colocation\_probability}(\text{object}_i, \text{object}_n)}{\text{distinct\_edges}} \quad (1)$$

iii. locatedOnTopOf (object1, object2): this spatial relation denotes if an object1 (say 'cup') can reside on top of another object2 (say 'table').

iv. occlusionBy(object1, object2): this relation denotes the probability that an object1 can get hidden or occluded by another object2. This is based on the relative average dimensions of the objects. These objects should ideally have a high 'coLocatedWith' probability.

Figure 6:
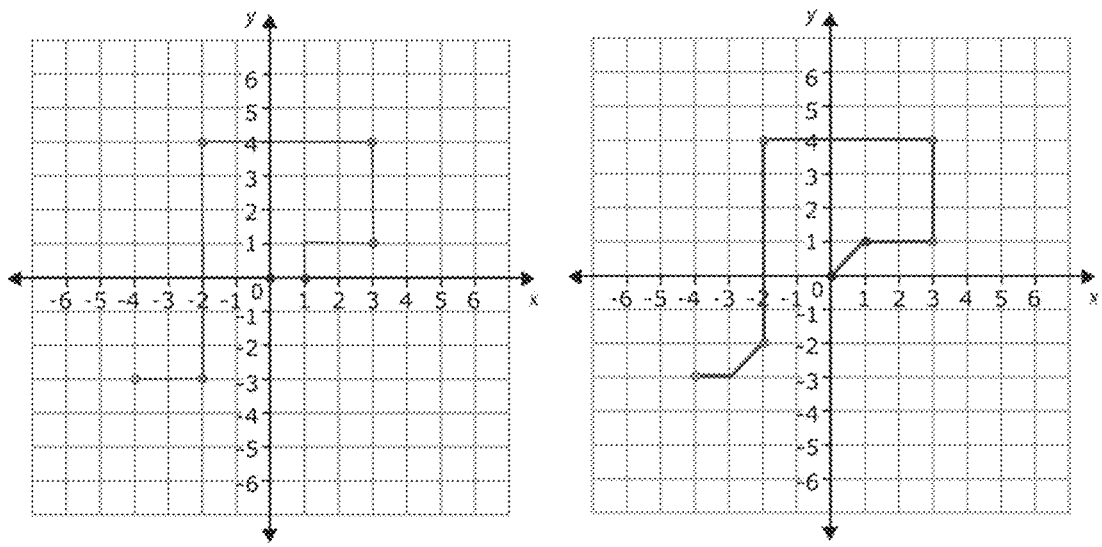
FIG. 6 depict a graphical representation illustrating the geometric semantic map based robot navigation without and with diagonal moves according to some embodiments of the present disclosure.

2. Geometric semantic (GeoSem) Map: In the present disclosure, spatial cues used in robot navigation to a specific location are roughly categorized as: (a) Natural Language Descriptions of the location (e.g., name of client project with floor), (b) Natural Language Directions (e.g., left to cafeteria), (c) Location Labels that can be either numeric or alphanumeric (e.g., room number), (d) Directional Signs (e.g., library marked by left arrow), (e) Sketch Map (e.g., Hand drawn sketches by human or rough layout), (f) Metric Map (layout of navigational space, e.g., rooms in a building floor), (g) Hybrid metric sketch (e.g., annotations on layout), and (h) Pointing gestures (e.g., human points to right when queried about a location). In the method of the present disclosure, concept of the GeoSem Map is used which builds a smaller but semantically richer map based on frontal RGB perception combined with geometrical movement monitoring of the robot defined steps. FIG. 6 depicts a graphical representation illustrating the geometric semantic map based robot navigation without and with diagonal moves according to some embodiments of the present disclosure. As shown in FIG. 6, it is based on a 2-D co-ordinate system, where the robot is placed initially at the origin. If the actuation capability of the robot is limited to certain action steps such as move forward by 'M' metre or rotate left by 'D' degrees, then the robot's location in the 2-D map is referred by distinct (x,y) co-ordinates. If the robot's action space is discreet like having fixed movement capacity, then the robot should rotate at 90° angles. Otherwise, the robot' rotation angle should be 45° each time to help it navigate the map in grid forms of fixed square sides and diagonals. Further, if an obstacle is encountered in egocentric view of next trajectory direction, the robot avoids the obstacle by going around it and restoring its trajectory by taking help of the Geo-Sem map. After each successful movement in the action space, a scene is analyzed to find relational objects to determine its next move. While the robot is completing its action move, scene processing happens only to handle dynamic obstacles, thereby saving computation time. Here, each location step stores a tuple comprising the relative direction of egocentric view, objects in scene with confidence score and a calculated landmark score for that point. In an embodiment, the Landmark score is computed based on a probability of the target object being found in a scene as well as the combined probabilities of objects located in the scene and their relations to target object. The landmark score is expressed as shown in equation (2) below:

$$\text{Landmark Score} = \frac{\sum prob(\text{object, target})}{\sum \text{objects}} \cdot prob(\text{zone, target}) \cdot \alpha \cdot \frac{\sum |\text{rotation}°|}{360°} \quad (2)$$

Ideally as the robot moves forward, the landmark score should keep on increasing until the target object is found. In an embodiment, the Landmark score is classified as a low landmark score and a high landmark score. In an embodiment, the low landmark score indicates movement of the robotic device on an incorrect trajectory and the high landmark score indicates movement of the robotic device on a correct trajectory. In other words, a lowering landmark score signifies that the robot is going in wrong direction. Here, rotation$^0$ is indicative of rotational moves in a zone to determine whether a scene in the zone has been explored in totality. Further, a denotes a scaling factor specific to environmental settings. In comparison to traditional approaches, the robot's primary task here is not to map the environment, but to reach the target object. The mapping is done for the robot to remember the landmark points (with respect to the target object finding) traversed so that it can backtrack to an earlier location if current trajectory is not successful or can shorten the backtrack exploration if the robot finds itself close to earlier path point(s).

In an embodiment, at step 208 of the present disclosure, the one or more hardware processors 204 are configured to iteratively perform, via the robotic device executed by the one or more hardware processors, a navigation step based on the geometric semantic map until at least one of (i) the target object is detected, and (ii) geometric semantic map based analysis of the scene is completed. In an embodiment, at each of the navigation step, a plurality of attributes comprising a relative direction of the one or more views, one or more objects in the scene with a confidence score, and a landmark score computed for the navigation step are stored. In an embodiment, since RGB egocentric view is only perception available under the settings for the present disclosure, the scene processing has to be carried out very intelligently. If the object relations in a scene with a zone (say room) is low, then the robot should move to a different scene, else it should explore the scene by further rotation and consequential exploration. In the same scene, if occlusion objects are present which are capable of hiding the target object based on dimensional relationship, then, free space to go around identified occlusion is navigated to bring the object in view. The scene is measured by image height and weight. The scene is broken into polygonal segments. In an embodiment, a step of detecting target object from one or more objects comprised in a scene and having maximum probable relation to the target object is performed by determining a parameter computed as a product of (i) the confidence score of the target object, and (ii) a centroid value computed for the target object and the one or more objects with maximum probable relation to the target object. In other words, ideally, the robot should move towards a polygon segment having one or more objects with maximum probable relation to target object. In an embodiment, decision to move towards the polygon segment is based on a centroid having maximum summation of relation probability by combination of objects belonging to the polygon segment). If the robot exhibits actuation capability of tilting and panning or zooming camera, finer scene processing is possible by segmenting the scene into smaller regions of interest.

In an embodiment, the navigation step can be better understood by way of the following description provided as exemplary explanation:

In the present disclosure, the navigation step utilizes combined approaches of visual semantics as well as geometry based decision making based on actual robot actuation capability. In an embodiment, with an initial view of the robot at start location (say egocentric view of scene ES1), first the scene is processed for object detection and corresponding GeoSem map updation. If target object is identified in ES1, then the robot terminates the navigation. Further, if a door or some opening into another zone (say room) is observed nearby based on the object detection, then the robot moves in the free space close to that zone for doing a rotation scan. However, if no openings are found, then the robot does a full 360° rotational scan for scene analysis. Further, the robot determines which way to move based on relational decision making and occlusion estimates. The robot moves towards the zone that has highest chance of finding the object. If an obstacle falls in the way it will bypass it following a grid motion pattern. The robot can backtrack to a point in path (with next high probability of target object finding) when its current trajectory path reaches a dead end. This process is repeated until the robot can view the object or exhaustive search is over. In an embodiment, knowledge of metric size of the robot's body helps in approximating spaces that it should avoid when going through doors or avoiding obstacles. In an embodiment, each navigation step stores a plurality of attributes comprising relative direction of the one or more views, one or more objects in the scene with a confidence score and a landmark score computed for that navigational step.

In an embodiment, at step 210 of the present disclosure, the one or more hardware processors 204 are configured to dynamically update the geometric semantic map and the knowledge store with information of analyzed scenes learned over a period of time at each navigational step.

The entire approach/method of the present disclosure can be further better understood by way of following pseudo code provided as example:

```
Result: Target object becomes visible in egocentric view
Parameters:
image ← RGB camera egocentric image stream;
actuation ← movement commands to robot wheels;
knowledge ← link to semantic knowledge store;
geosem ← geometric semantic map representation;
software ← link to software modules;
target ← target object to search (user instruction);
sa ← area of scene (example: Left, Middle, Right);
while target != found or geosem. Scan != full do
Wait for actuation completion;
    if geosem.landmarkScore Is Low then
        actuation ← geosem.past actuation;
        continue;
    end
sa, objects ← software.objectDetect(image);
knowledge.updateRelations(objects, sa);
if 'restricted objects' Not In sa[i to n] then
    sa ← sa[ keep matched indices ];
end
if 'obstacle objects' Not In sa[i to n] then
sa ← sa[ keep matched indices ];
end
if knowledge.ZoneRelation(sa) Is Low then
    if 'opening' or 'doors' In sa then
        actuation ← sa[found area];
        continue;
    end
else if 'relational objects' in sa then
    For each sa:
    c ← centroid of knowledge.RP(object, target)
    * software. confidence_score(object);
    actuation ← sa[ max (c) ];
    else if 'free space' in sa then
        actuation ← sa[ free space ];
else
    actuation ← geosem. Laststep;
geosem.Update(actuation, objects, sa);
end
if target == found then
print 'Target Found.; actuation ← STOP;
end
else if geosem. Scan == full then
print 'Target Not Found.; actuation ← STOP;
end
```

Figure 7A:
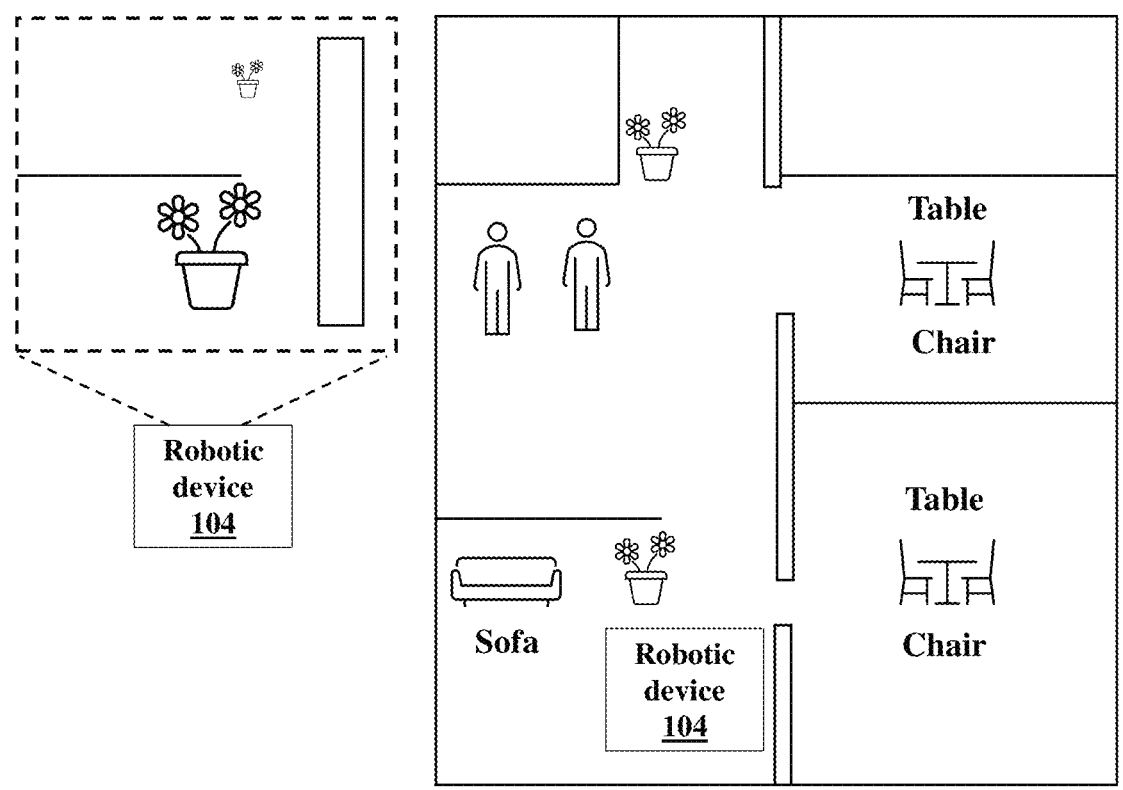
FIGS. 7A and 7B show simulation results for object detection using a geometric semantic map based robot navigation, in accordance with an embodiment of the present disclosure.
Figure 7B:
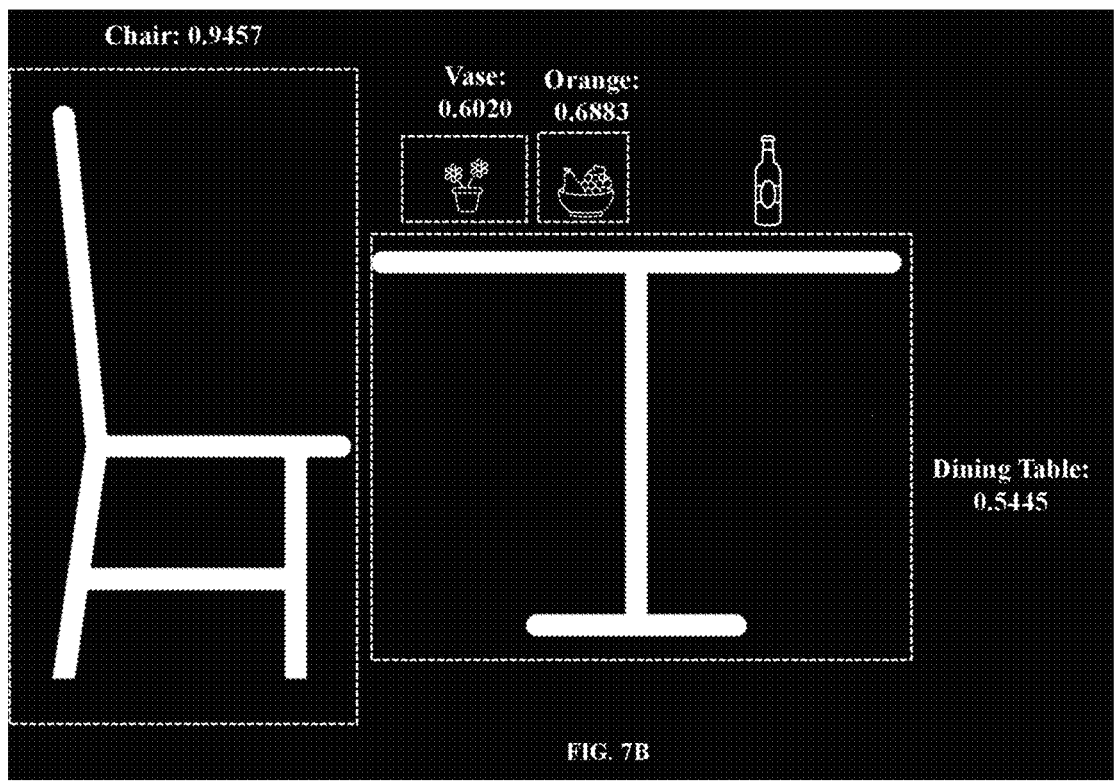

Experimental Results:

FIGS. 7A and 7B show simulation results for object detection using a geometric semantic map based robot navigation, in accordance with an embodiment of the present disclosure. FIG. 7A shows indoor environment simulation for object detection using a geometric semantic map based robot navigation, in accordance with an embodiment of the present disclosure. As shown in FIG. 7A, an indoor environment was created using Webots4 and among available robot models, Tiago Iron5 was selected to simulate wheeled navigation. The robot was set at an initial position away from the target object and issued a goal to find target object which is 'orange'. Movement commands come from a discreet set of actions which includes rotate left, rotate right, go back, go forward, and stop. In an embodiment, ten human users were given keyboard controls of the action space and were asked to play a game of navigating to the target object from an initial scene. It was observed from simulation results that average time for successful human navigation was around 6 minutes, whereas minimum and maximum time taken were 1 minute 23 seconds and 13 minutes 12 seconds respectively. However, for the same task, the robot took a time around 2 minutes. FIG. 7B shows the target object finding in simulation for object detection using a geometric semantic map based robot navigation, in accordance with an embodiment of the present disclosure. As shown in FIG. 7B, the task was marked complete when object detector algorithm could detect the target object from the egocentric view with good confidence. It was observed from the gamified experiment that (a) most people preferred breadth first search strategy, (b) first person view (egocentric camera view) was found tough in terms of entering new zones and avoiding collision, and (c) most people ignored looking at objects at the initial back view of the robot and moved forward from initial view.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The embodiments of present disclosure provide systems and methods to navigate in unknown scenes based only on egocentric RGB perception of a wheeled service robot. The present disclosure is based on the GeoSem map and rich semantics based decision making was found to work satisfactorily in both simulated environment as well as real world deployment in indoor settings. The present disclosure is further extended to estimate depth from RGB view to enable dynamic obstacle avoidance and richer mapping of objects in landmark points.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g., hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
acquiring, via an image capturing device mounted on a robotic device executed by one or more hardware processors, a set of successive egocentric images corresponding to one or more views of one or more scenes in an action space based-indoor environment, wherein the action space based-indoor environment comprises a target object to be detected;
retrieving from a knowledge store comprised in a system database, via the one or more hardware processors, a semantic relational knowledge representation, maintained in an ontological form, for each of the egocentric images from the set of successive egocentric images corresponding to the one or more views of the one or more scenes in the action space based-indoor environment, wherein the knowledge store comprises a plurality of informative data associated with (i) actuation capability of the robotic device during navigation, and (ii) the one or more scenes in the action space based-indoor environment, wherein the informative data associated with the one or more scenes in the action space based-indoor environment comprises a plurality of objects, relationship between the plurality of objects, one or more obstacle objects, one or more restricted areas, and one or more landmark points present in the one or more scenes;
generating, via the one or more hardware processors, a geometric semantic map for the action space based-indoor environment based on the semantic relational knowledge representation and a geometrical movement monitoring of the robotic device;
iteratively performing, via the robotic device executed by the one or more hardware processors, a navigation step based on the geometric semantic map until at least one of (i) the target object is detected, and (ii) geometric semantic map based analysis of the scene is completed, wherein at each of the navigation steps, a plurality of attributes comprising a relative direction of the one or more views, one or more objects in the scene with a confidence score, a landmark score computed for the navigation step, are stored, wherein the Landmark score is computed in accordance with a) probability of the target object being found in a scene, and b) a combined probabilities of objects located in the scene and their relations to the target object, wherein the landmark score is computed based on:
rotation$^0$ indicative of rotational moves in a zone to determine whether a scene in the zone explored in totality,
identifying presence of occlusion objects hiding the target object based on dimensional relationship;
navigating to free space to go around identified occlusion to bring the target object in view;
wherein the scene is broken into a one or more polygonal segments,
wherein the step of detecting the target object from the one or more objects comprised in the scene and having a maximum relation probability value computed based on distinct co-location probabilities and distinct edges between objects to the target object is performed by determining a parameter computed as a product of (i) the confidence score of the target object, and (ii) a centroid value computed for the target object and the one or more objects with maximum probable relation to the target object, wherein decision to move towards the polygonal segment is based on the centroid having maximum summation of relation probability by combination of objects belonging to the polygon segment; and
dynamically updating, via the one or more hardware processors, the geometric semantic map and the knowledge store with information of analyzed scenes learned over a period of time at each navigational steps.

2. The method of claim 1, wherein the geometrical movement monitoring of the robotic device includes recording (i) a successful movement of the robotic device on a navigation path associated with the navigation step, (ii) backtracking the robotic device to a location with next high probability of the target object found on the navigation path, when current trajectory in the navigation path of the robotic device reaches a dead end, and (iii) shortening backtrack exploration if the robotic device is detected to be close to a location in a previous trajectory on the navigation path, wherein task of the robotic device is to reach the target object by remembering landmark points with respect to the target object finding traversed, to backtrack to an earlier location if current trajectory is not successful or shorten the backtrack exploration if the robotic device finds itself close to earlier path point(s).

3. The method of claim 1, wherein the Landmark score is classified as one of a low landmark score and a high landmark score, wherein the low landmark score indicates movement of the robotic device on an incorrect trajectory, and the high landmark score indicates movement of the robotic device on a correct trajectory.

4. A system, comprising:
a memory storing instructions;
one or more communication interfaces;
a filter device; and
one or more hardware processors coupled to the memory via the one or more communication interfaces, wherein the one or more hardware processors are configured by the instructions to:
acquire, via an image capturing device mounted on a robotic device executed by one or more hardware processors, a set of successive egocentric images corresponding to one or more views of one or more scenes in an action space based-indoor environment, wherein the action space based-indoor environment comprises a target object to be detected;
retrieve from a knowledge store comprised in a system database, via the one or more hardware processors, a semantic relational knowledge representation, maintained in an ontological form, for each of the egocentric images from the set of successive egocentric images corresponding to the one or more views of the one or more scenes in the action space based-indoor environment, wherein the knowledge store comprises a plurality of informative data associated with (i) actuation capability of the robotic device during navigation and (ii) the one or more scenes in the action space based-indoor environment, wherein the informative data associated with the one or more scenes in the action space based-indoor environment comprises a plurality of objects, relationship between the plurality of objects, one or more obstacle objects, one or more restricted areas, and one or more landmark points present in the one or more scenes;
generate, a geometric semantic map for the action space based-indoor environment based on the semantic relational knowledge representation and a geometrical movement monitoring of the robotic device;
iteratively perform, via the robotic device executed by the one or more hardware processors, a navigation step based on the geometric semantic map until at least one of (i) the target object is detected, and (ii) geometric semantic map based analysis of the scene is completed, wherein at each of the navigation steps, a plurality of attributes comprising a relative direction of the one or more views, one or more objects in the scene with a confidence score, a landmark score computed for the navigation step, are stored, wherein the Landmark score is computed in accordance with a) probability of the target object being found in a scene, and b) a combined probabilities of objects located in the scene and their relations to the target object, wherein the landmark score is computed based on:
rotation$^0$ is indicative of rotational moves in a zone to determine whether a scene in the zone explored in totality,
identify presence of occlusion objects hiding the target object based on dimensional relationship;
navigate to free space to go around identified occlusion to bring the target object in view;
wherein the scene is broken into a one or more polygonal segments,
wherein the step of detecting the target object from the one or more objects comprised in the scene and having a maximum relation probability value computed based on distinct co-location probabilities and distinct edges between objects to the target object is performed by determining a parameter computed as a product of (i) the confidence score of the target object, and (ii) a centroid value computed for the target object and the one or more objects with maximum probable relation to the target object, wherein decision to move towards the polygonal segment is based on the centroid having maximum summation of relation probability by combination of objects belonging to the polygon segment; and
dynamically update the geometric semantic map and the knowledge store with information of analyzed scenes learned over a period of time at each navigational steps.

5. The system of claim 4, wherein the geometrical movement monitoring of the robotic device includes recording (i) a successful movement of the robotic device on a navigation path associated with the navigation step, (ii) backtracking the robotic device to a location with next high probability of the target object found on the navigation path when current trajectory in the navigation path of the robotic device reaches a dead end, and (iii) shortening backtrack exploration if the robotic device is detected to be close to a location in a previous trajectory on the navigation path, wherein task of the robotic device is to reach the target object by remembering landmark points with respect to the target object finding traversed, to backtrack to an earlier location if current trajectory is not successful or shorten the backtrack exploration if the robotic device finds itself close to earlier path point(s).

6. The system of claim 4, wherein the Landmark score is classified as one of a low landmark score and a high landmark score, wherein the low landmark score indicates movement of the robotic device on an incorrect trajectory, and the high landmark score indicates movement of the robotic device on a correct trajectory.

7. One or more non-transitory computer readable mediums comprising one or more instructions which when executed by one or more hardware processors cause:
acquiring, via an image capturing device mounted on a robotic device executed by one or more hardware processors, a set of successive egocentric images corresponding to one or more views of one or more scenes in an action space based-indoor environment, wherein the action space based-indoor environment comprises a target object to be detected,
retrieving from a knowledge store comprised in a system database, via the one or more hardware processors, a semantic relational knowledge representation, maintained in an ontological form, for each of the egocentric images from the set of successive egocentric images corresponding to the one or more views of the one or more scenes in the action space based-indoor environment, wherein the knowledge store comprises a plurality of informative data associated with (i) actuation capability of the robotic device during navigation, and (ii) the one or more scenes in the action space based-indoor environment, wherein the informative data associated with the one or more scenes in the action space based-indoor environment comprises a plurality of objects, relationship between the plurality of objects, one or more obstacle objects, one or more restricted areas, and one or more landmark points present in the one or more scenes;

generating a geometric semantic map for the action space based-indoor environment based on the semantic relational knowledge representation and a geometrical movement monitoring of the robotic device;

iteratively performing, via the robotic device executed by the one or more hardware processors, a navigation step based on the geometric semantic map until at least one of (i) the target object is detected, and (ii) geometric semantic map based analysis of the scene is completed, wherein at each of the navigation steps, a plurality of attributes comprising a relative direction of the one or more views, one or more objects in the scene with a confidence score, a landmark score computed for the navigation step, are stored, wherein the Landmark score is computed in accordance with a) probability of the target object being found in a scene, and b) a combined probabilities of objects located in the scene and their relations to the target object, wherein the landmark score is computed based on:

$rotation^o$ is indicative of rotational moves in a zone to determine whether a scene in the zone explored in totality, identifying presence of occlusion objects hiding the target object based on dimensional relationship;

navigating to free space to go around identified occlusion to bring the target object in view;

wherein the scene is broken into a one or more polygonal segments, wherein the step of detecting the target object from the one or more objects comprised in the scene and having a maximum relation probability value computed based on distinct co-location probabilities and distinct edges between objects to the target object is performed by determining a parameter computed as a product of (i) the confidence score of the target object, and (ii) a centroid value computed for the target object and the one or more objects with maximum probable relation to the target object, wherein decision to move towards the polygonal segment is based on the centroid having maximum summation of relation probability by combination of objects belonging to the polygon segment; and dynamically updating the geometric semantic map and the knowledge store with information of analyzed scenes learned over a period of time at each navigational steps.

* * * * *